United States Patent [19]
Miura

[11] Patent Number: 6,084,842
[45] Date of Patent: Jul. 4, 2000

[54] REFLECTIVE LIGHT BEAM FOCUSING DEVICE WITH MULTIPLE FOCAL POINTS

[75] Inventor: Akira Miura, Tokorozawa, Japan

[73] Assignee: Pioneer Electronic Corporation, Tokyo-to, Japan

[21] Appl. No.: 09/038,124

[22] Filed: Mar. 11, 1998

[30] Foreign Application Priority Data

Mar. 13, 1997 [JP] Japan .................................. 9-059625

[51] Int. Cl.$^7$ .............................. G11B 7/135; G11B 7/12
[52] U.S. Cl. .................... 369/112; 369/44.37; 369/44.23
[58] Field of Search ................... 369/112, 44.23, 369/110, 121, 109, 44.14, 44.37, 44.38, 94, 108; 359/216–219, 834, 833; 250/236

[56] References Cited

U.S. PATENT DOCUMENTS

| | | | |
|---|---|---|---|
| 4,460,989 | 7/1984 | Russell | 369/108 |
| 5,173,603 | 12/1992 | Lindaccher | 359/216 |
| 5,311,495 | 5/1994 | Ando | 369/112 |
| 5,425,016 | 6/1995 | Sutker | 369/100 |
| 5,532,997 | 7/1996 | Pauli | 369/112 |
| 5,790,327 | 8/1998 | Lee et al. | 369/112 |
| 5,886,970 | 3/1999 | Tachibana et al. | 369/112 |

*Primary Examiner*—Do Hyun Yoo
*Assistant Examiner*—Kim-Kwok Chu
*Attorney, Agent, or Firm*—Pitney, Hardin, Kipp and Szuch LLP

[57] ABSTRACT

A multiple focal light beam generating device is provided with a multiple focal mirror device, to which a light beam is incident from a front side thereof. The device has a plurality of mirror surfaces arranged in serial to the incident light beam such that at least one mirror surface other than a mirror surface disposed farthest from the front side comprises a half mirror surface, for reflecting the incident light beam respectively at each of the mirror surfaces into directions different from each other as a plurality of partial light beams; and a light condensing device, to which the partial light beams are inputted from the multiple focal mirror device, for respectively condensing the partial light beams such that positions of maximally condensed points of the partial light beams are different from each other.

14 Claims, 4 Drawing Sheets

REFLECTIVE LIGHT BEAM FOCUSING DEVICE WITH MULTIPLE FOCAL POINTS

BACKGROUND OF THE INVENTION

1. Field of the Invention

The present invention relates to an optical pickup for generating a plurality of light beams having maximally condensed points different from each other to cope with various types of discs, which distances from disc surfaces to information record surfaces thereof (i.e., the thicknesses of the protection layers of the discs) are different from each other, such as a CD (Compact Disc), a DVD (i.e., a high recording density disc which has the same size as the CD and which record capacity is much larger than the CD) and the like by use of a single information reproducing apparatus.

2. Description of the Related Art

There is a DVD as a high recording density disc, which recording capacity is much larger than the conventional CD and is capable of recording one movie etc., and there is being developed a CD/DVD compatible player which is capable of reproducing both of the DVD and the CD.

Comparing the structures of the CD and the DVD with each other, the thickness of the protection layer of the DVD (about 0.6 mm) is about half of that of the CD (about 1.2 mm) because of the requirement of improving the recording density. Therefore, if both of the discs are to be reproduced by use of a single optical pickup having just one focal point, e.g., if the optical pickup converges the light so as optimize the light beam for the DVD, the aberration such as a spherical aberration etc., that is generated is severe for the CD, since the protection layer of the CD through which the light beam passes is thicker than that of the DVD, resulting in such a problem that the optical pickup cannot converge the light beam to be optimal for the CD.

Further, the sizes of information pits formed to record the information are different from each other between the CD and the DVD (more concretely, the length of the shortest pit among the information pits formed on the CD is about 0.87 μm while that on the DVD is about 0.4 μm). Thus, in order to precisely read the respective information pits on these two types of discs, it is necessary to form the light spot optimum for the size of the information pit on each of the CD and the DVD.

The size (i.e. the diameter) of the light spot is proportional to the ratio of the wavelength of the light beam and the numerical aperture of the objective lens to converge the light beam onto the information record surface. Namely, assuming that the wavelength of the light beam is constant, as the numerical aperture is increased, the size of the light spot is increased. Thus, in case that the CD and the DVD are reproduced by the optical pickup having one focal point, if the numerical aperture is set optimum for the information pit on the DVD while the wavelength of the light beam is set constant, there is raised such a problem that the light spot is too small for the information pit on the CD, so that the distortion is generated in the reproduction signal when reproducing the CD and that the information cannot be precisely read.

Therefore, in order to solve the above mentioned problems, there is a bifocal optical pickup having a bifocal lens capable of emitting two light beams, which have maximally condensed points at positions different from each other on a same straight line and which form two light spots respectively optimum for the sizes of the information pits on the CD and the DVD.

The bifocal lens is constructed by arranging a diffraction grating such as a hologram diffraction grating or the like on a optical path same as that of the objective lens, so as to separate an incident light beam, which has been collimated by a collimator lens, into three light beams i.e., a 0 order light, a +1 order light and a −1 order light by the diffraction grating. By utilizing the fact that the hypothetical position of a light emitting point of the 0 order light and that of the +1 order light after the separation (which are the positions of the light emitting point of the 0 order light and the +1 order light after the separation in case of viewing them from the DVD side or the CD side of the objective lens. Since the path of the 0 order light and the path of the +1 order light are different from each other, it can be hypothetically supposed that the light emitting points of these two lights which are based on the paths after the separation are different from each other) are different from each other with respect to the objective lens, the 0 order light and the +1 order light are converged at different positions on a same straight line. At this time, among the light beams, the light beam passes through the diffraction grating becomes the 0 order light, and the light beam diffracted by the diffraction pattern of the diffraction grating becomes the +1 order light.

More concretely, as for the positions of the focal points, the bifocal lens is constructed such that the +1 order light is focused at a position farther from the objective lens than the 0 order light, and that the 0 order light is converged optimally for the information record surface of the DVD, while the +1 order light is converged optimally for the information record surface of the CD.

By use of the bifocal lens, it is possible to reproduce both of the CD and the DVD by use of a single optical pickup.

However, in the above explained bifocal optical pickup, since the light beam is separated by the diffraction grating, there are generated the −1 order light and some higher order lights other than the 0 order light and the +1 order light which are to be emitted onto the DVD and the CD respectively. Further, in case of reproducing the DVD, the +1 order light becomes one of the useless lights, while the 0 order light becomes one of the useless lights in case of reproducing the CD. Then, there may happen such a case that these useless lights are returned to a light detector, which are to detect the reflection light from the CD or the DVD, as a so-called stray light. When this case happens, the detection output due to the stray light is mixed as a noise into the detection signal to be primarily detected, so that an accurate information reproduction cannot be performed, which is a problem.

SUMMARY OF THE INVENTION

The present invention is proposed in view of the above mentioned problems. It is therefore an object of the present invention to provide: a multiple focal light beam generating device, which can emit a plurality of light beams having maximally condensed points different from each other so as to reproduce various type of information record mediums e.g., the DVD, the CD and so on, respectively while the stray light due to a useless light beam is reduced at the light detector; a multiple focal optical pickup having the multiple focal light beam generating device; and an information reproducing apparatus having the multiple focal optical pickup.

The above object of the present invention can be achieved a multiple focal light beam generating device provided with: a multiple focal mirror device, to which a light beam is incident from a front side thereof, having a plurality of mirror surfaces arranged in serial to the incident light beam such that at least one mirror surface other than a mirror surface disposed farthest from the front side comprises a half mirror surface, for reflecting the incident light beam respectively at each of the mirror surfaces into directions different from each other as a plurality of partial light beams; and a light condensing device, to which the partial light beams are inputted from the multiple focal mirror device, for respectively condensing the partial light beams such that positions of maximally condensed points of the partial light beams are different from each other.

According to the multiple focal light beam generating device, when the light beam is incident to the multiple focal mirror device from the front side thereof, the incident light beam is partially reflected as one partial light beam and partially transmitted by at least one mirror surface comprising a half mirror surface. Then, in case that there is just one mirror surface comprising such a half mirror surface, the partially transmitted light beam is partially or substantially fully reflected as another partial light beam by the mirror surface disposed farthest from the front side. Alternatively, in case that there are a plurality of mirror surfaces each comprising such a half mirror surface, the partially transmitted light beam from one half mirror surface is again partially reflected as another partial light beam by another half mirror surface, one after another. Then, finally, the partially transmitted light beam is partially or substantially fully reflected as another partial light beam by the mirror surface disposed farthest from the front side. In the above mentioned operation, the partial light beams are respectively reflected into directions different from each other. Then, the partial light beams are inputted to the light condensing device. Then, the partial light beams are respectively condensed by the light condensing device such that the positions of maximally condensed points of the partial light beams are different from each other. Accordingly, a plurality of light beams having positions of the maximally condensed points different from each other can be obtained without generating a useless diffraction light as compared with the case of generating such light beams by virtue of the diffraction grating or the like.

In one aspect of the multiple focal light beam generating device, a mirror surface of the mirror surfaces disposed nearest to the front side comprises a flat half mirror surface.

According to this aspect, when the light beam is incident to the multiple focal mirror device, the incident light beam is partially reflected as one partial light beam and partially transmitted by the flat half mirror surface. Thus, the structure of the multiple focal mirror device can be simplified.

In another aspect of the multiple focal light beam generating device, the mirror surface disposed farthest from the front side comprises a reflecting surface for substantially fully reflecting the incident light beam inputted thereto.

According to this aspect, the partially transmitted light beam is substantially fully reflected as another partial light beam by the mirror surface disposed farthest from the front side. Thus, the incident light beam can be used at a high efficiency in total.

In another aspect of the multiple focal light beam generating device, the mirror surfaces have curvatures different from each other.

According to this aspect, the partial light beams can be reflected into the different directions easily and surely by virtue of the different curvatures of the mirror surfaces.

In another aspect of the multiple focal light beam generating device, at least one of the mirror surfaces comprises a concave surface having a curvature to reduce a divergence angle of the incident light beam after a reflection thereat.

According to this aspect, the multiple focal mirror device can additionally function as a collimator lens (i.e., a lens for collimating the incident light beam or a convex lens) since it has the concave surface to reflect the incident light beam.

In another aspect of the multiple focal light beam generating device, the multiple focal mirror device is provided with: a main body integrally formed of a single material; and mirror coating layers coated on surfaces of the main body and having the mirror surfaces.

According to this aspect, the multiple focal mirror device can be constructed as a bifocal mirror device in one body having a rather simple structure.

In another aspect of the multiple focal light beam generating device, the multiple focal mirror device is provided with: a plurality of bodies formed of materials different from each other and bonded to each other; and mirror coating layers coated on surfaces of the bodies and having the mirror surfaces.

According to this aspect, the multiple focal mirror device can be constructed in various patterns to reflect two or more than two of the partial light beams in different directions.

In another aspect of the multiple focal light beam generating device, the multiple focal mirror device is provided with: a plurality of lenses coated with mirror coating layers and having the mirror surfaces; and a transparent adhesive layer adhering the lenses to each other.

According to this aspect, the multiple focal mirror device can be constructed in various patterns to reflect two or more than two of the partial light beams in different directions.

The above object of the present invention can be also achieved by a multiple focal optical pickup provided with (i) a light beam emitting device for emitting a light beam, (ii) a multiple focal light beam generating device provided with: a multiple focal mirror device, to which the light beam emitted by the light beam emitting device is incident from a front side thereof, having a plurality of mirror surfaces arranged in serial to the incident light beam such that at least one mirror surface other than a mirror surface disposed farthest from the front side comprises a half mirror surface, for reflecting the incident light beam respectively at each of the mirror surfaces into directions different from each other as a plurality of partial light beams; and a light condensing device, to which the partial light beams are inputted from the multiple focal mirror device, for respectively condensing the partial light beams such that positions of maximally condensed points of the partial light beams are different from each other, and that one of the positions of maximally condensed points is positioned on an information record surface of an information record medium, and (iii) a light receiving device for receiving the partial light beams returned from the information record surface and outputting a light reception signal having a signal component corresponding to one of the received partial light beams which has been maximally condensed on the information record surface.

According to the multiple focal pickup, a light beam is emitted by the light beam emitting device. Then, this emitted light beam is incident to the above described multiple focal light beam generating device of the present invention. In this case, by the light condensing device, the partial light beams are respectively condensed such that one of the positions of maximally condensed points is positioned on an information record surface of an information record medium. Then, the partial light beams returned from the information record surface are received by the light receiving device, and the light reception signal having a signal component corresponding to one of the received partial light beams, which has been maximally condensed on the information record surface, is outputted by the light receiving device. Accordingly, it is possible to output the light reception signal without generating a noise component due to a useless diffraction light as compared with the case of generating such a plurality of light beams by virtue of the diffraction grating or the like. Further, the light reception signal can have a high signal to noise ratio while other received partial light beams, which have never been maximally condensed on the information record surface, are treated as noises having rather little levels.

Furthermore, since the multiple focal mirror device has both functions of guiding the incident light beam toward the information record medium and generating a plurality of light beams, the structure of the optical pickup can be simplified.

In one aspect of the multiple focal optical pickup, the light condensing device respectively condenses the partial light beams such that at least two of the positions of maximally condensed points are respectively positioned on information record surfaces of at least two different types of information record mediums.

According to this aspect, at least two different types of information record medium e.g., the DVD, the CD and so on, can be reproduced just by use of the multiple focal optical pickup as a single optical pickup.

In another aspect of the multiple focal optical pickup, the multiple focal optical pickup is further provided with a collimator lens disposed between the light beam emitting device and the multiple focal light beam generating for collimating the light beam emitted by the light beam emitting device.

According to this aspect, the incident light beam can be collimated by the collimator lens before it is inputted to the multiple focal light beam generating device.

In another aspect of the multiple focal optical pickup, at least one of the mirror surfaces comprises a concave surface having a curvature to reduce a divergence angle of the incident light beam after a reflection thereat.

According to this aspect, the multiple focal mirror device can additionally function as a collimator lens (i.e., a lens for collimating the incident light beam or a convex lens) since it has the concave surface to reflect the incident light beam. Thus, the structure of the optical system in the multiple focal optical pickup can be simplified.

The above object of the present invention can be also achieved by an information reproducing apparatus provided with (i) a light beam emitting device for emitting a light beam, (ii) a multiple focal light beam generating device provided with: a multiple focal mirror device, to which the light beam emitted by the light beam emitting device is incident from a front side thereof, having a plurality of mirror surfaces arranged in serial to the incident light beam such that at least one mirror surface other than a mirror surface disposed farthest from the front side comprises a half mirror surface, for reflecting the incident light beam respectively at each of the mirror surfaces into directions different from each other as a plurality of partial light beams; and a light condensing device, to which the partial light beams are inputted from the multiple focal mirror device, for respectively condensing the partial light beams such that positions of maximally condensed points of the partial light beams are different from each other, and that one of the positions of maximally condensed points is positioned on an information record surface of an information record medium, (iii) a light receiving device for receiving the partial light beams returned from the information record surface and outputting a light reception signal having a signal component corresponding to one of the received partial light beams which has been maximally condensed on the information record surface, and (iv) a reproducing device for reproducing information recorded on the information record surface and outputting a reproduction signal on the basis of the light reception signal.

According to the information reproducing apparatus, the light reception signal is outputted by the above described multiple focal optical pickup of the present invention, the information recorded on the information record surface can be reproduced and the reproduction signal is outputted on the basis of the light reception signal, by the reproducing device. Thus, on the basis of the light reception signal having the high signal to noise ratio as described above, the quality of the reproduction signal can be certainly improved.

In one aspect of the information reproducing apparatus, the light condensing device respectively condenses the partial light beams such that at least two of the positions of maximally condensed points are respectively positioned on information record surfaces of at least two different types of information record mediums.

According to this aspect, at least two different types of information record medium e.g., the DVD, the CD and so on, can be reproduced by use of the multiple focal optical pickup as a single optical pickup. Thus, the structure of the information reproducing apparatus as a whole can be simplified.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention will be explained with reference to the drawings.

(I) First Embodiment

First of all, a structure of an optical information reproducing apparatus as a first embodiment of the present invention is explained with reference to FIGS. 1A and 1B. An optical information reproducing apparatus S shown in FIGS. 1A and 1B is compatible for the information reproduction from the DVD and the information reproduction from the CD, wherein FIG. 1A shows a case of reproducing the information from a DVD 1 and FIG. 1B shows a case of reproducing the information from a CD 2.

Figure 1A:
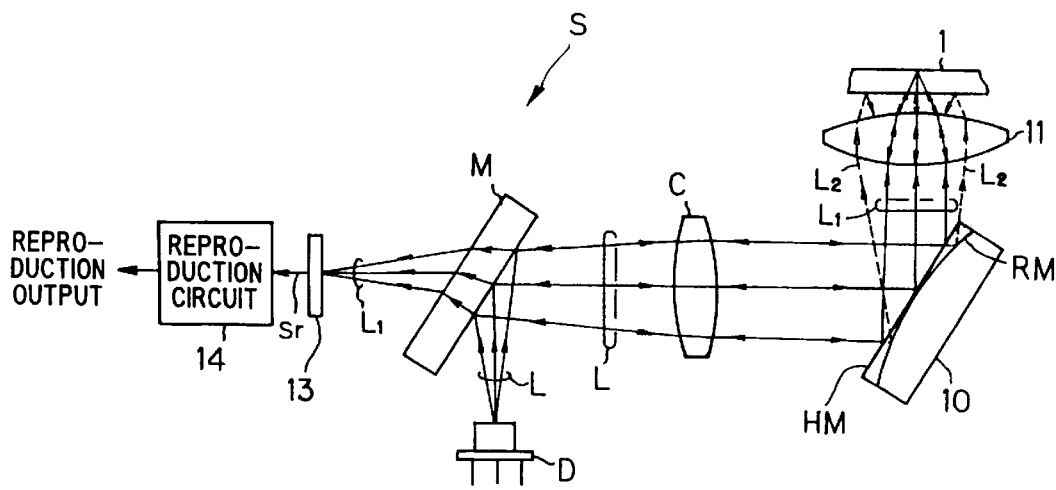
FIG. 1A is a block diagram of an optical information reproducing apparatus as a first embodiment of the present invention, in a condition of reproducing the information from the DVD.
Figure 1B:
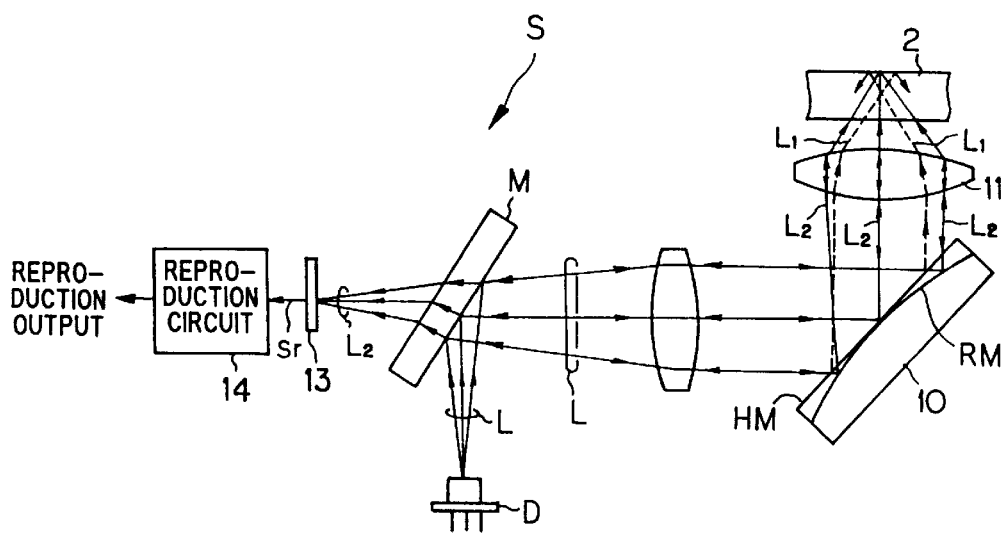
FIG. 1B is a block diagram of the optical information reproducing apparatus as the first embodiment, in a condition of reproducing the information from the CD.

In FIGS. 1A and 1B, the optical information reproducing apparatus S as the first embodiment is provided with: a laser diode D as one example of a light emitting device; a half mirror M; a collimator lens C; a bifocal mirror 10; an objective lens 11 as one example of a light converging device; a photo-detector 13 as one example of a light receiving device; and a reproduction circuit 14 as one example of a reproduction device.

The bifocal mirror 10 is provided with: a half mirror surface HM for reflecting one part of an incident light beam L as a partial light beam L1 and for transmitting the other part of the light beam L as a partial light beam L2; and a reflecting surface RM for fully reflecting the partial light beam L2, which has been transmitted through the half mirror surface HM.

Next, the operation of the present embodiment is explained.

At first, the operation in the case of reproducing the information from the DVD 1 is explained with reference to FIG. 1A.

The light beam L emitted from the laser diode D is reflected by the half mirror M, is collimated by the collimator lens C and is inputted to the bifocal mirror 10.

Then, among the light beam L inputted to the bifocal mirror 10, one part is reflected by the half mirror surface HM, is emitted to the objective lens 11 as the partial light beam L1, is converged by the objective lens 11 onto an information record surface of the DVD 1, and is reflected by the information record surface. Then, the reflection light from the information record surface is transmitted through an optical path same as the optical path until the partial light beam L1 reaches the information record surface, and is inputted again to the bifocal mirror 10. Then, after the astigmatism is given to the partial light beam L1 as the partial light beam L1 is transmitted through the collimator lens C and the half mirror M, the partial light beam L1 is inputted to the photo-detector 13, so that a light reception signal Sr corresponding to the received partial light beam L1 is outputted from the photo-detector 13. To the light reception signal Sr, a D/A (Digital to Analog) converting process, a de-interleaving process, a demodulating process and so on to reproduce the information, are applied in the reproduction circuit 14.

Here, the photo-detector 13 is divided into four pieces i.e. four light receiving elements by a cross shaped division line. Here, on one hand, the light reception signals outputted from one pair of the light receiving elements diagonally opposed to each other and the light reception signals outputted from another pair of the light receiving elements diagonally opposed to each other are added together, so as to be used for a focus servo control by means of the astigmatism method. On the other hand, an RF (Radio Frequency) signal is generated in the reproduction circuit 14 on the basis of the light reception signal Sr, which is obtained by adding all of the light reception signals from the four light receiving elements. Finally, this RF signal is outputted as the reproduction output such as an audio signal, a video signal, a data signal or the like to the external.

Next, the operation in the case of reproducing the information from the CD 2 is explained with reference to FIG. 1B.

In the same manner as in the aforementioned case of FIG. 1A, the light beam L emitted from the laser diode D is reflected by the half mirror M, is collimated by the collimator lens C and is inputted to the bifocal mirror 10.

Then, among the light beam L inputted to the bifocal mirror 10, another part is transmitted through the half mirror surface HM, is fully reflected by the reflecting surface RM, is emitted to the objective lens 11 as the partial light beam L2, is converged by the objective lens 11 onto an information record surface of the CD 2, and is reflected by the information record surface. Then, the reflection light from the information record surface is transmitted through an optical path same as the optical path until the partial light beam L2 reaches the information record surface, and is inputted again to the bifocal mirror 10. Then, after the astigmatism is given to the partial light beam L2 as the partial light beam L2 is transmitted through the collimator lens C and the half mirror M, the partial light beam L2 is inputted to the photo-detector 13, so that the light reception signal Sr corresponding to the received partial light beam L2 is outputted from the photo-detector 13. Then, in the same manner as in the aforementioned case of FIG. 1A, the D/A converting process, the de-interleaving process, the demodulating process and so on are applied to the light reception signal Sr in the reproduction circuit 14, and the RF signal is finally outputted as the reproduction output to the external.

The angle and the position of the half mirror surface HM of the bifocal mirror 10 are set such that the partial light beam L1 reflected by the half mirror surface HM is optimally converged by the objective lens 11 on the information record surface of the DVD 1 in the operation explained above.

On the other hand, the curvature, the angle and the position of the reflecting surface RM of the bifocal mirror 10 are set such that the partial light beam L2 reflected by the reflecting surface RM is optimally converged by the objective lens and the spherical aberration is optimally corrected on the information record surface of the CD 2 in the operation explained above.

Further, in the case of reproducing the information from the DVD 1 in FIG. 1A, the partial light beam L2 (which is indicated by a dashed line in FIG. 1A) other than the partial light beam L1 is generated in due course, is fully reflected by the reflecting surface RM, and reaches the information record surface of the DVD 1 through the objective lens 11. However, in this case, since the partial light beam L2 is reflected by the information record surface of the DVD 1 before it is converged or focused, the optical path of the reflection light of the partial light beam L2 is not same as that of the reflection light of the partial light beam L1. Thus, the reflection light of the partial light beam L2 is not converged or focused on the photo-detector 13.

On the other hand, in the case of reproducing the information from the CD 2 in FIG. 1B, the partial light beam L1 (which is indicated by a dashed line in FIG. 1A) other than the partial light beam L2 is generated in due course, is reflected by the half mirror surface HM, and reaches the information record surface of the CD 2 through the objective lens 11. However, in this case, since the partial light beam L1 is reflected by the information record surface of the CD 2 after it is converged or focused, the optical path of the reflection light of the partial light beam L1 is not same as that of the reflection light of the partial light beam L2. Thus, the reflection light of the partial light beam L1 is not converged or focused on the photo-detector 13.

Next, a concrete structure of the bifocal mirror 10 is explained with reference to FIGS. 2A, 2B and 2C.

There are various types of structures for the bifocal mirror 10. For example, in a case of constructing the bifocal mirror 10 by an integral formation, as shown in FIG. 2A, the bifocal mirror is constructed by (1) forming a bifocal mirror main body of resin or glass, which has one surface as a flat surface and another surface as a spherical surface, (2) applying a half mirror coating onto the flat surface to be the half mirror surface RH, and (3) applying a reflecting coating onto the spherical surface to be the reflecting surface RM.

Figure 2C:
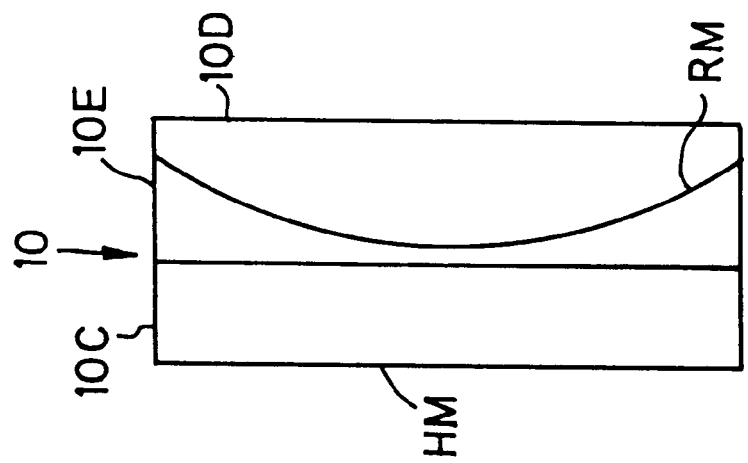
FIG. 2C is a sectional view of a bifocal lens, which is constructed by bonding two lenses, for use in the first embodiment.
Figure 2B:
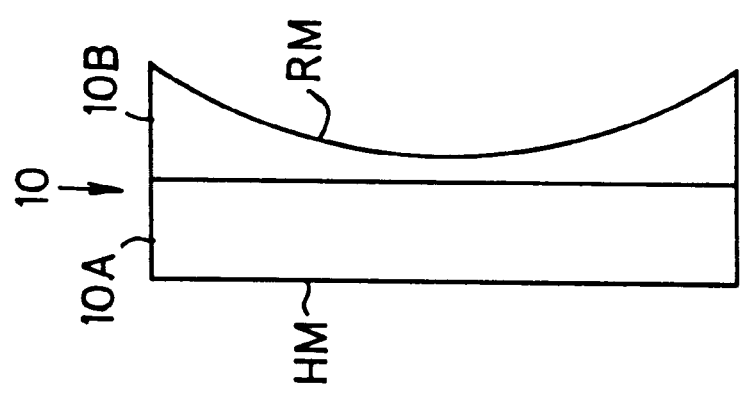
FIG. 2B is a sectional view of a bifocal lens, which is formed of two different types of materials, for use in the first embodiment.

In a case of constructing the bifocal mirror 10 by use of two different types of materials, as shown in FIG. 2B, the bifocal mirror is constructed by (1) bonding a glass portion 10A in a flat plate shape onto a resin portion 10B, which has one surface as a flat surface and another surface as a spherical surface, such that the flat surfaces are faced to each other (2) applying a half mirror coating onto the flat surface of the glass portion 10A to be the half mirror surface HM, and (3) applying a reflecting coating onto the spherical surface of the resin portion 10B to be the reflecting surface RM.

Further, in a case of constructing the bifocal mirror 10 by bonding two lenses, as shown in FIG. 2C, the bifocal mirror is constructed by (1) preparing a flat lens 10C comprising glass or resin and a spherical lens 10D comprising glass or resin, which has one surface as a flat surface and another surface as a spherical surface, (2) applying a reflecting coating onto the spherical surface of the spherical lens 10D to be the reflecting surface RM, (3) bonding the flat lens 10C and the spherical lens 10D to each other by transparent adhesive 10E such that the flat surface of the flat lens 10C and the spherical surface of the spherical lens 10D are faced to each other, and (4) applying a half mirror coating onto the flat surface of the glass portion 10C to be the half mirror surface HM.

Next, a designing method for the shape of the half mirror surface HM and the reflecting surface RM is explained with reference to FIGS. 1A and 1B.

At first, the shape of the half mirror surface HM is determined to satisfy the condition that the partial light beam L1 is transmitted through and refracted by each of (i) the objective lens 11 and (ii) the protection layer (which has a layer thickness of 0.6 mm and a refraction coefficient of 1.58, for example) of the DVD 1, and that the aberration (especially, the spherical aberration) becomes the minimum when the partial light beam L1 arrives at the information record surface of the DVD 1. In the first embodiment, the shape of the half mirror surface HM is designed to be flat. However, as long as satisfying the above mentioned condition, the half mirror surface HM may be spherical.

In the same manner, the shape of the reflecting surface RM is determined to satisfy the condition that the partial light beam L2 is transmitted through and refracted by each of (i) the objective lens 11, (ii) the protection layer (which has a layer thickness of 1.2 mm and a refraction coefficient of 1.58, for example) of the CD 2 and (iii) the transparent material (e.g., the resin or glass) existing between the half mirror surface HM and the reflecting surface RM, and that the aberration (especially, the spherical aberration) becomes the minimum when the partial light beam L2 arrives at the information record surface of the CD 2.

In actual cases, factors to be considered when designing the shapes of the half mirror surface HM and the reflecting surface RM, there are the shape of the objective lens 11, the shape of the information pits on each of the discs and so on, other than the above mentioned factors.

As explained above in detail, according to the optical information reproducing apparatus S of the first embodiment, the light beams, which have the positions of the maximally condensed points different from each other, can be generated by use of the partial light beam L1 and the partial light beam L2 which are separated by the half mirror surface HM of the bifocal mirror 10. Hence, as compared with the case where the light beams, which have the positions of the maximally condensed points different from each other, are generated by diffracting the light beam L by use of a diffraction grating etc., it is possible to generate the light beams having the positions of the maximally condensed points different from each other without generating useless diffraction light such as the −1 order light, the high order lights or the like.

Further, since the bifocal mirror 10 is constructed such that the half mirror surface HM and the reflecting surface RM are different in the curvature from each other, it is possible to surely differentiate the direction of the reflection of the partial light beam L1 and the direction of the reflection of the partial light beam L2.

Furthermore, since the light reception signal Sr is outputted on the basis of the reflection lights of the light beams having the positions of the maximally condensed points different from each other without generating the useless diffraction lights such as the −1 order light, the higher order lights and the like, the noise component due to the reflection light of the useless diffraction lights is not mixed into the light reception signal Sr, so that the quality of the light reception signal Sr is improved.

On the other hand, since one mirror can be commonly used as the mirror to direct the light beam L in the direction of the DVD 1 or the CD 2 and the mirror to generate the light beams having the positions of ht maximally condensed points different from each other, the structure of the optical pickup can be simplified.

Here, the effect of generating the light beams having the positions of the maximally condensed points different from each other by diffracting the light beam L by use of the diffraction grating etc., and that by use of the bifocal mirror in the present embodiment, are compared with each other.

In general, the light beams having the different maximally condensed points which are generated by diffracting the light beam by use of the diffraction grating are called as the 0 order light, the +1 order light and so on. In order to obtain this 0 order light or +1 order light, the sectional shape of the diffraction grating should be a saw-tooth shape, a rectangular shape or a blaze shape (i.e., a step-wise shape), for example. A high technique is required to produce a transparent diffraction grating having such a shape.

On the other hand, the efficiencies of the 0 order light or +1 order light generated by the diffraction grating are 58% for the rectangular shape pattern, 81% for the saw-tooth shape pattern, and 77% for the blaze shape pattern as the theoretical maximum values respectively.

Further, when generating the 0 order light or the +1 order light by the diffraction grating, as aforementioned, the higher order lights are inevitably generated as the stray lights to give a harmful influence onto the reproduction output.

In contrast to this, the bifocal mirror having the half mirror surface HM and the reflecting surface RM can be easily produced by means of the currently available techniques. The efficiencies of the partial light beams L1 and L2 can be made respectively as high as about 76%, assuming the transmissibility of the half mirror surface HM is 62% and the reflection coefficient of the reflecting surface RM is about 100%, in case that the light amounts of the partial light beams L1 and L2 are set equal to each other. Therefore, the effect approximately same as that in the above mentioned case of the blaze shape pattern can be obtained by the simple production process.

Further, according to the bifocal mirror 10, the partial light beams L1 and L2 do not behave as the stray lights to each other.

(II) Second Embodiment

Nextly, a structure of an optical information reproducing apparatus as a second embodiment of the present invention is explained with reference to FIGS. 3A and 3B.

In the above described first embodiment, the optical system includes the collimator lens C. In contrast to this, the second embodiment explained below is constructed such that the bifocal lens 10' has the function of the collimator lens C. An optical information reproducing apparatus S' shown in FIGS. 3A and 3B is compatible for the information reproduction from the DVD and the information reproduction from the CD, wherein FIG. 3A shows a case of reproducing the information from a CD 2 and FIG. 3B shows a case of reproducing the information from a DVD 1.

Figure 3A:
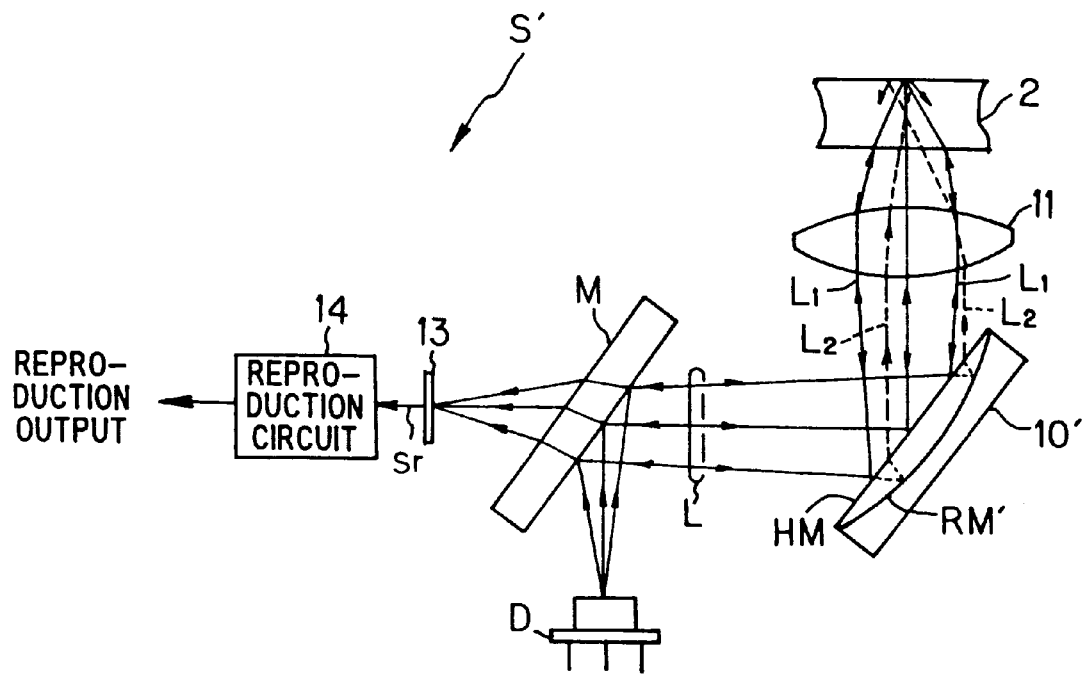
FIG. 3A is a block diagram of an optical information reproducing apparatus as a third embodiment of the present invention, in a condition of reproducing the information from the CD.
Figure 3B:
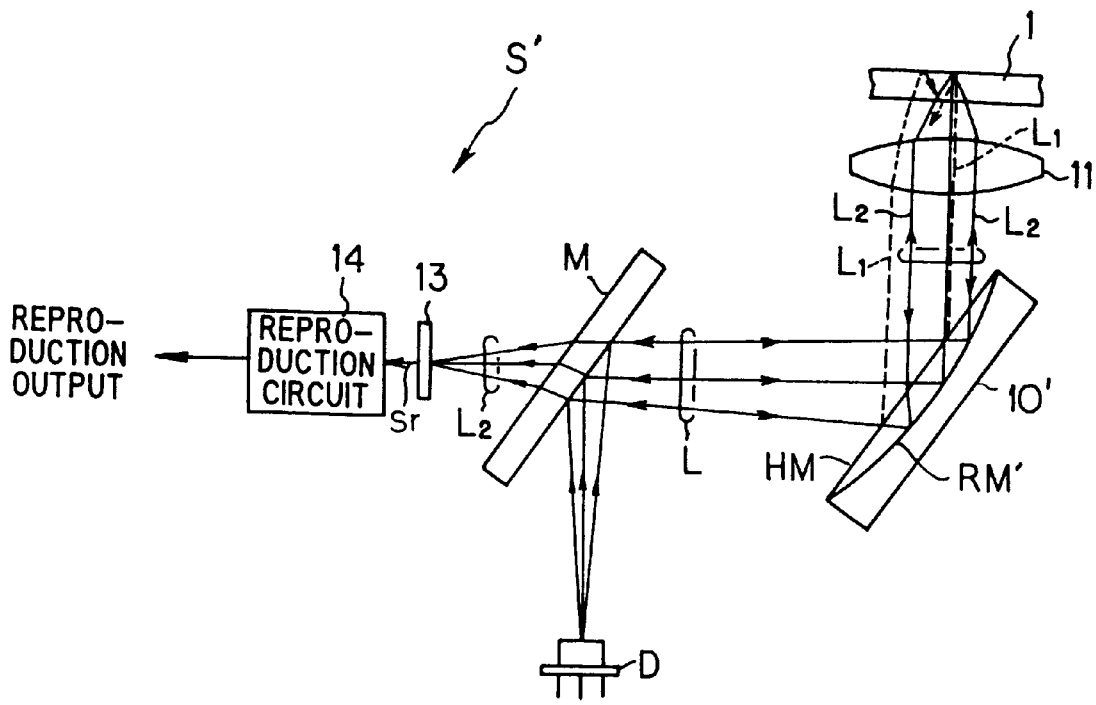
FIG. 3B is a block diagram of the optical information reproducing apparatus as the third embodiment, in a condition of reproducing the information from the DVD.

In FIGS. 3A and 3B, the optical information reproducing apparatus S' as the second embodiment is constructed same as the optical information reproducing apparatus S of the first embodiment except that the collimator lens C is omitted and that the bifocal lens 10 is replaced by the bifocal lens 10'. By such a structure, the light beam L reflected by the half mirror M is diverged and inputted to the bifocal mirror 10'.

The bifocal mirror 10' is provided with: a half mirror surface HM for reflecting one part of a light beam L, which is diverged and inputted thereto, as a partial light beam L1 and converging it though the objective lens 11 onto the CD 2, and for transmitting another part of the light beam L as a partial light beam L2; and a reflecting surface RM' for fully reflecting the partial light beam L2 which has been transmitted through the half mirror surface HM and for converging it through the objective lens 11 onto the DVD 1. Here, the reflecting surface RM' is constructed in a concave surface shape with respect to the partial light beam L2 so that the diverging angle of the partial light beam L2, which is diverging and inputted to the reflecting surface RM' (i.e., the angle equivalent to half of an apex angle of a circular cone, when the partial light beam L2 is regarded as diverging and advancing in the shape of the circular cone) is made small and is resembled to be a collimated light flux.

Next, the operation of the present embodiment is explained.

At first, the operation in the case of reproducing the information from the CD 2 is explained with reference to FIG. 3A.

The light beam L emitted from the laser diode D is reflected by the half mirror M, and is inputted to the bifocal mirror 10'.

Then, among the light beam L inputted to the bifocal mirror 10', one part is reflected by the half mirror surface HM, is emitted to the objective lens 11 as the partial light beam L1, is converged by the objective lens 11 onto an information record surface of the CD 2, and is reflected by the information record surface. Then, the reflection light from the information record surface is transmitted through an optical path same as the optical path until the partial light beam L1 reaches the information record surface, and is inputted again to the bifocal mirror 10'. Then, after the astigmatism is given to the partial light beam L1 as the partial light beam L1 is transmitted through the half mirror M, the partial light beam L1 is inputted to the photo-detector 13, so that a light reception signal Sr corresponding to the received partial light beam L1 is outputted from the photo-detector 13. To the light reception signal Sr, a D/A (Digital to Analog) converting process, a de-interleaving process, a demodulating process and so on to reproduce the information, are applied in the reproduction circuit 14.

Next, the operation in the case of reproducing the information from the DVD 1 is explained with reference to FIG. 3B.

In the same manner as in the aforementioned case of FIG. 3A, the light beam L emitted from the laser diode D is reflected by the half mirror M, and is inputted to the bifocal mirror 10'.

Then, among the light beam L inputted to the bifocal mirror 10', another part is transmitted through the half mirror surface HM, is fully reflected by the reflecting surface RM', is emitted to the objective lens 11 as the partial light beam L2, is converged by the objective lens 11 onto an information record surface of the DVD 1, and is reflected by the information record surface. Then, the reflection light from the information record surface is transmitted through an optical path same as the optical path until the partial light beam L2 reaches the information record surface, and is inputted again to the bifocal mirror 10'. Then, after the astigmatism is given to the partial light beam L2 as the partial light beam L2 is transmitted through the half mirror M, the partial light beam L2 is inputted to the photo-detector 13, so that the light reception signal Sr corresponding to the received partial light beam L2 is outputted from the photo-detector 13. Then, in the same manner as in the aforementioned case of FIG. 3A, the D/A converting process, the de-interleaving process, the demodulating process and so on are applied to the light reception signal Sr in the reproduction circuit 14, and the RF signal is finally outputted as the reproduction output to the external.

The angle and the position of the half mirror surface HM of the bifocal mirror 10' are set such that the partial light beam L1 reflected by the half mirror surface HM is optimally converged by the objective lens 11 on the information record surface of the CD 2 in the operation explained above.

On the other hand, the curvature, the angle and the position of the reflecting surface RM' of the bifocal mirror 10', as a concave surface mirror, are set such that the partial light beam L2 reflected by the reflecting surface RM' is optimally converged by the objective lens and the spherical aberration is optimally corrected on the information record surface of the DVD 1 in the operation explained above.

Further, in the case of reproducing the information from the CD 2 in FIG. 3A, in the same manner as the first embodiment, the partial light beam L2 (which is indicated by a dashed line in FIG. 3A) other than the partial light beam L1 is generated in due course, is fully reflected by the reflecting surface RM', and reaches the information record surface of the CD 2 through the objective lens 11. However, in this case, since the partial light beam L2 is reflected by the information record surface of the CD 2 after it has been once converged or focused, the optical path of the reflection light of the partial light beam L2 is not same as that of the reflection light of the partial light beam L1. Thus, the reflection light of the partial light beam L2 is not converged or focused on the photo-detector 13.

On the other hand, in the case of reproducing the information from the DVD 1 in FIG. 3B, the partial light beam L1 (which is indicated by a dashed line in FIG. 3A) other than the partial light beam L2 is generated in due course, and reaches the information record surface of the DVD 1 through the objective lens 11. However, in this case, since the partial light beam L1 is reflected by the information record surface of the DVD 1 before it is converged or focused, the optical path of the reflection light of the partial light beam L1 is not same as that of the reflection light of the partial light beam L2. Thus, the reflection light of the partial light beam L1 is not converged or focused on the photo-detector 13.

Next, a designing method for the shape of the half mirror surface HM and the reflecting surface RM' is explained with reference to FIGS. 3A and 3B.

At first, the shape of the half mirror surface HM is determined to satisfy the condition that the partial light beam L1 is transmitted through and refracted by each of (i) the objective lens 11 and (ii) the protection layer (which has a layer thickness of 1.2 mm and a refraction coefficient of 1.58, for example) of the CD 2, and that the aberration (especially, the spherical aberration) becomes the minimum when the partial light beam L1 arrives at the information record surface of the CD 2. In the second embodiment, the shape of the half mirror surface HM is designed to be flat. However, as long as satisfying the above mentioned condition, the half mirror surface HM may be spherical.

In the same manner, the shape of the reflecting surface RM' is determined to satisfy the condition that the partial light beam L2 is transmitted through and refracted by each of (i) the objective lens 11, (ii) the protection layer (which has a layer thickness of 0.6 mm and a refraction coefficient of 1.58, for example) of the DVD 1 and (iii) the transparent material (e.g., the resin or glass) existing between the half mirror surface HI and the reflecting surface RM', and that the aberration (especially, the spherical aberration) becomes the minimum when the partial light beam L2 arrives at the information record surface of the DVD 1.

Figure 2A:
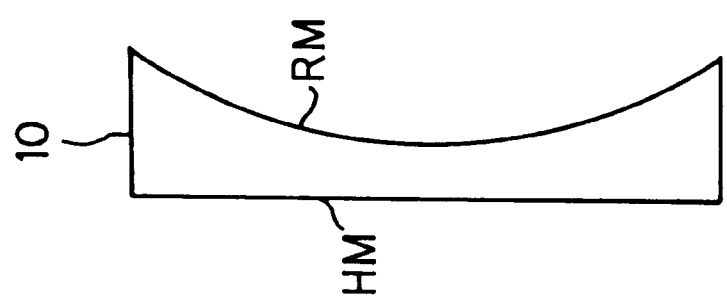
FIG. 2A is a sectional view of a bifocal lens, which is integrally formed, for use in the first embodiment.

As for the concrete structure of the bifocal mirror 10', various structures can be employed, as shown in FIGS. 2A, 2B and 2C in the first embodiment, for example.

As explained above in detail, according to the optical information reproducing apparatus S' of the second embodiment, in addition to the advantageous effect of the optical information reproducing apparatus S' of the first embodiment, since the bifocal mirror 10' has additionally the function of the convex lens such as a collimator lens or the like, the structure of the optical information reproducing apparatus can be more simplified.

In the above described embodiments, although the two light beams having the different positions of the maximally condensed points are generated, the present invention is not limited to this. Instead, it is possible to generate three or more light beams having the different positions of the maximally condensed points.

Figure 4:
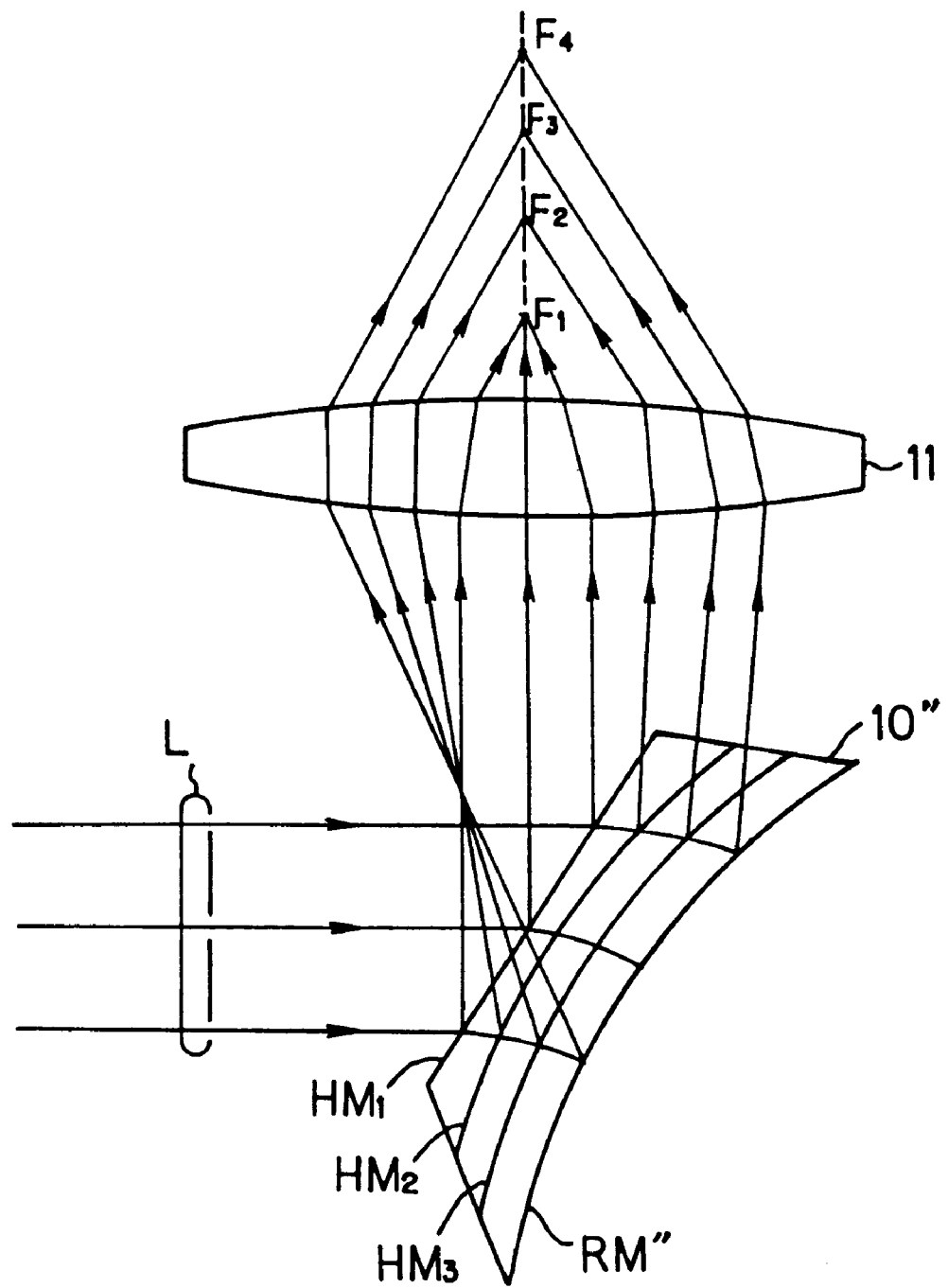
FIG. 4 is a diagram showing a structure of a multiple focal lens in case of generating 4 light beams having maximally condensed points different from each other.

For example, in case of generating four light beams having the different positions of the maximally condensed points, as shown in FIG. 4, a multiple focal mirror 10" having half mirror surfaces HM1, HM2 and HM3 and a reflecting surface RM" may be employed. Then, a maximally condensed point F1 is formed by a partial light beam reflected by the half mirror surface HM1, a maximally condensed point F2 is formed by a partial light beam reflected by the half mirror surface HM2, a maximally condensed point is formed by a partial light beam reflected by the half mirror surface HM3, and a maximally condensed point F4 is formed by a partial light beam reflected by the reflecting surface RM".

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A light beam reflective device with multiple focal points comprising:

a multiple focal mirror device, to which a light beam is incident from a front side thereof, having a stacked plurality of mirror and half mirror surfaces arranged with respect to the incident light beam such that at least one surface other than a surface disposed farthest from the front side comprises a half mirror surface, for reflecting the incident light beam respectively at each of said mirror surfaces into directions different from each other as a plurality of partial light beams; and a light condensing device, to which the partial light beams are inputted from said multiple focal mirror device, for respectively focusing the partial light beams such that positions of maximally focal points of the partial light beams are different from each other.

2. A light beam reflective device according to claim 1, wherein a surface of said plurality of surfaces disposed nearest to the front side comprises a flat half mirror surface.

3. A light beam reflective device generating device according to claim 1, wherein said surface disposed farthest from the front side comprises a reflecting surface for substantially fully reflecting the incident light beam inputted thereto.

4. A light beam reflective device according to claim 1, wherein said surfaces have curvatures different from each other.

5. A light beam reflective device according to claim 1, wherein at least one of said surfaces comprises a concave surface having a curvature to reduce a divergence angle of the incident light beam after a reflection thereat.

6. A light beam reflective device according to claim 1, wherein said multiple focal mirror device comprises:

a main body integrally formed of a single material; and mirror coating layers coated on surfaces of said main body forming said mirror and half surfaces.

7. A light beam reflective device according to claim 1, wherein said multiple focal mirror device comprises:

a plurality of bodies formed of materials different from each other and bonded to each other; and mirror coating layers coated on surfaces of said bodies forming said mirror and half surfaces.

8. A light beam reflective device according to claim 1, wherein said multiple focal mirror device comprises:

a plurality of lenses coated with mirror coating layers forming said mirror and half mirror surfaces; and a transparent adhesive layer adhering said lenses to each other.

9. A multiple focal optical pickup comprising (i) a light beam emitting device for emitting a light beam, (ii) a light beam reflecting device with multiple focal points comprising:

a multiple focal mirror device, to which the light emitted by said light beam emitting device is incident from a front side thereof, having a stacked plurality of mirror and half mirror surfaces arranged with respect to the incident light beam such that at least one mirror surface other than a mirror surface disposed farthest from the front side comprises a half mirror surface, for reflecting the incident light beam respectively at each of said mirror surfaces into directions different from each other as a plurality of partial light beams; and a light condensing device, to which the partial light beams are inputted from said multiple focal mirror device, for respectively focusing the partial light beams such that positions of maximally focused points of the partial light beams are different from each other, and that one of the positions of maximally focused points is positioned on an information record surface of an information record medium, and (iii) a light receiving device for receiving the partial light beams returned from the information record surface and outputting a light reception signal having a signal component corresponding to one of the received partial light beams which has been maximally focused on the information record surface.

10. A multiple focal optical pickup according to claim 9, wherein said light condensing device respectively focuses the partial light beams such that at least two of the positions of maximally focused points are respectively positioned on information record surfaces of at least two different types of information record mediums.

11. A multiple focal optical pickup according to claim 9, further comprising a collimator lens disposed between said light beam emitting device and said light beam reflecting device for collimating the light beam emitted by said light beam emitting device.

12. A multiple focal optical pickup according to claim 9, wherein at least one of said mirror and half mirror surfaces comprises a concave surface having a curvature to reduce a divergence angle of the incident light beam after a reflection thereat.

13. An information reproducing apparatus comprising (i) a light beam emitting device for emitting a light beam, (ii) a light beam reflecting device with multiple focal points comprising:

a multiple focal mirror device, to which the light beam emitted by said light beam emitting device is incident from a front side thereof, having a stacked plurality of mirror and half mirror surfaces arranged with respect to the incident light beam such that at least one mirror surface other than a mirror surface disposed farthest from the front side comprises a half mirror surface, for reflecting the incident light beam respectively at each of said mirror surfaces into directions different from each other as a plurality of partial light beams; and a light focusing device, to which the partial light beams are inputted from said multiple focal mirror device, for respectively focusing the partial light beams such that positions of maximally focused points of the partial light beams are different from each other, and that one of the positions of maximally focused points is positioned on an information record surface of an information record medium, (iii) a light receiving device for receiving the partial light beams returned from the information record surface and outputting a light reception signal having a signal component corresponding to one of the received partial light beams which has been maximally condensed on the information record surface, and (iv) a reproducing device for reproducing information recorded on the information record surface and outputting a reproduction signal on the basis of the light reception signal.

14. An information reproducing apparatus according to claim 13, wherein said light condensing device respectively condenses the partial light beams such that at least two of the positions of maximally focused points are respectively positioned on information record surfaces of at least two different types of information record mediums.

\* \* \* \* \*